United States Patent
Albert (10) Patent No.: US 6,506,298 B2
(45) Date of Patent: Jan. 14, 2003

(54) BIOFILTERING SYSTEM FOR TREATING WASTEWATER EFFLUENT

(75) Inventor: Belhumeur Albert, Orford (CA)

(73) Assignee: Berger Group Ltd., Quebec (CA)

( * ) Notice: Subject to any disclaimer, the term of this patent is extended or adjusted under 35 U.S.C. 154(b) by 18 days.

(21) Appl. No.: 09/828,905

(22) Filed: Apr. 10, 2001

(65) Prior Publication Data

US 2001/0027942 A1 Oct. 11, 2001

Related U.S. Application Data (63) Continuation-in-part of application No. 09/572,138, filed on May 16, 2000, now Pat. No. 6,372,128.

(30) Foreign Application Priority Data

Apr. 10, 2000 (CA) ............................................. 2304935
Jul. 28, 2000 (CA) ............................................. 2314689

(51) Int. Cl.[7] .............................. C02F 3/04; C02F 3/28; C02F 24/40
(52) U.S. Cl. ....................... 210/137; 210/170; 210/263; 210/921; 210/257.1; 210/150; 73/863.52
(58) Field of Search .................... 261/97, 98; 210/150, 210/151, 85, 97, 137, 170, 263, 265, 293, 257.1, 456, 472, 617, 618, 921; 73/863.52; 405/37, 40, 44, 45

(56) References Cited

U.S. PATENT DOCUMENTS

| | | |
|---|---|---|
| 1,805,852 A | 5/1931 | Simpson |
| 2,795,542 A | 6/1957 | Horne et al. .................. 210/17 |
| 3,933,641 A | 1/1976 | Hadden et al. ............. 210/205 |
| 4,614,584 A | 9/1986 | Di Duca ..................... 210/422 |
| 4,995,969 A | 2/1991 | LaVigne ..................... 210/150 |
| 5,017,040 A | 5/1991 | Mott ............................ 405/32 |
| 5,108,614 A | 4/1992 | Ross et al. .................. 210/665 |
| 5,206,206 A | 4/1993 | Buelna et al. ............. 502/404 |
| 5,264,129 A | 11/1993 | Simpson et al. ............ 210/611 |
| 5,322,629 A | 6/1994 | Stewart ...................... 210/767 |
| 5,360,556 A | 11/1994 | Ball et al. ................... 210/804 |
| 5,362,397 A | 11/1994 | Cyr ............................. 210/610 |
| 5,453,182 A | 9/1995 | Kikuta ........................ 210/169 |
| 5,618,414 A | 4/1997 | Goupil et al. ............... 210/151 |
| 5,690,827 A | 11/1997 | Simmering et al. ......... 210/602 |
| 5,810,510 A | 9/1998 | Urriola ......................... 405/45 |
| 5,871,647 A | 2/1999 | Lord ........................... 210/615 |
| 5,989,416 A | 11/1999 | Gorton ....................... 210/151 |

FOREIGN PATENT DOCUMENTS

| | | |
|---|---|---|
| EP | 382459 A1 | 8/1990 |
| FR | 2606769 | 5/1988 |
| GB | 2306954 A | 5/1997 |
| WO | WO-94/13590 | * 6/1994 |

* cited by examiner

*Primary Examiner*—Joseph W. Drodge
*Assistant Examiner*—Terry K. Cecil
(74) *Attorney, Agent, or Firm*—Ogilvy Renault (57) ABSTRACT

A biofiltering system for treating wastewater effluent (e.g. from a septic tank) through a bed of peat 16 overlying an effluent absorption area 12 and into the earth beneath 14. The bed of peat has a predetermined biofiltering capacity. A fluid flow regulator 18 upstream from the peat is adapted to allow the effluent to flow at a rate greater than the peat bed biofiltering capacity. However, a distribution system arranged over the peat is configured such that wastewater received from the fluid flow regulator flows through the peat bed at a rate no greater than the peat bed biofiltering capacity. The distribution system 20 includes a plurality of spaced-apart, elongated distribution conduits 72 having discharge orifices 74 spaced longitudinally therealong. The biofiltering system allows large quantities of wastewater to be efficiently treated irrespective of the flow rate thereof.

24 Claims, 6 Drawing Sheets

BIOFILTERING SYSTEM FOR TREATING WASTEWATER EFFLUENT

CROSS-REFERENCE TO RELATED APPLICATION

This application is a continuation-in-part of U.S. patent application Ser. No. 09/572,138 filed May 16, 2000, now U.S. Pat. No. 6,372,128.

BACKGROUND OF THE INVENTION

The present invention pertains to improvements in the field of wastewater treatment. More particularly, the invention relates to a biofiltering system for treating wastewater effluent leaving a septic tank.

Small wastewater treatment systems are typically designed so that raw wastewater generated by a residence is discharged directly into a septic tank. Once discharged into the septic tank, the effluent is allowed to partially settle and is then passed into a dosing chamber. From the dosing chamber, the effluent is fed into a filtering medium, e.g. a trickling bed filter, and then collected in a central drain pipe. Once the effluent is collected in the central drain pipe, it is then dispersed to a plurality of parallel drain pipes positioned generally equidistant from one another across a specified area underneath the ground. Each drain pipe has a plurality of orifices which allow the effluent to be released into the surrounding environment.

Various filtering media and devices have been proposed for treating the wastewater discharged from a septic tank. For example, U.S. Pat. No. 5,206,206 discloses the use of pre-treated peat in biofilters for wastewater treatment. The pre-treated peat comprises a mixture of pre-sieved peat with a Fe-containing compound and lime. A filter bed constituted of a layer of such a pre-treated peat disposed between upper and lower layers of calcareous stones is arranged inside a filtration column. A rotary distribution system including a perforated arm is used for distributing the wastewater to be treated on top of the filter bed. Since the pressure of the incoming wastewater serves to displace the perforated arm and the wastewater entering the distribution system contains suspended particles of organic and inorganic materials, the suspended particles often clog the rotation mechanism, thus rendering the distribution system inoperative.

U.S. Pat. No. 5,618,414 also discloses a wastewater treatment system utilizing peat as a filtering medium. Such a treatment system comprises a container having an upper portion, a lower portion, at least one waster water inlet in the upper portion of the container for receiving the wastewater, and an opening in the lower portion of the container for allowing the treated water to escape the container. At least one elongated hollow casing is mounted within the lower portion of the container. The casing has an open bottom surface and defines at least two treatment chambers within the container, each of the treatment chambers containing a bed of peat for treating the wastewater. At least one distribution means is also provided for distributing the wastewater entering the container through the wastewater inlet into at least one of the treatment chambers. Each distribution means comprises a water inlet pipe connected to the wastewater inlet and leading above the casing and a trough tiltably mounted on top of a corresponding casing. The trough extends along the casing and has two opposite sides. It defines at least one wastewater receiving means on one of the two sides and it is tiltable between a first position whereat the wastewater receiving means receives wastewater exiting the water inlet pipe and a second position whereat the wastewater received in the receiving means flows out of the same. The trough also has counterweight means on its other side for holding it in the first position while it is filled up and for bringing it back from the second position to the first position after the at least one wastewater receiving means has been emptied. In addition, at least one distribution plate is mounted above the bed of peat in one of the treatment chambers defined by the corresponding hollow casing. This at least one distribution plate comprises a plurality of channels projecting from the trough, each of the channels having an end for receiving wastewater flowing from the trough so that the wastewater is divided into a plurality of flows each flowing in a corresponding channel, each of the channels also having at least one opening for letting the wastewater drip into the corresponding treatment chamber.

The use of the aforesaid tiltable trough in combination with the distribution plate for distributing the wastewater over the bed of peat presents certain drawbacks. When the wastewater enters the container at a high flow rate and a large amount of wastewater is continuously received in the trough over a period of time, the trough rapidly tilts between the aforesaid first and second positions so that the wastewater flowing therefrom floods the channels defined in the distribution plate and flows over the edges of the distribution plate and onto the bed of peat. There is thus flooding of the bed of peat. Since any given peat has a predetermined biofiltering capacity over which the peat will not act as a biofiltering medium, flooding of the bed of peat will cause the wastewater to flow through the bed of peat at a flow rate greater than the biofiltering capacity of the peat, resulting in a non-efficient removal of both organic and inorganic materials.

In order to overcome the above drawbacks, Applicant has proposed in U.S. patent application Ser. No. 09/572,138 now U.S. Pat. No. 6,372,128 a biofiltering device comprising a housing having inlet means for receiving the wastewater to be treated and outlet means for discharging the treated wastewater, a bed of peat disposed inside the housing between the inlet and outlet means, the peat defining a biofiltering medium having a predetermined biofiltering capacity, and means for aerating the peat. Such a device further includes a fluid flow control system arranged over the bed of peat and in fluid flow communication with the inlet means, for distributing the wastewater through the bed of peat in a manner such that when the wastewater enters the system at a flow rate greater than the biofiltering capacity of the peat, the wastewater discharged from the system flows through the bed of peat at a flow rate no greater than the biofiltering capacity.

According to a preferred embodiment of the biofiltering device described in the aforesaid application, the fluid flow control system comprises a fluid flow control unit having a chamber of variable volume in fluid flow communication with the inlet means and a member provided with a plurality of spaced-apart discharge orifices in fluid flow communication with the chamber and facing the bed of peat, the volume of the chamber varying in response to a variation of the flow rate of the wastewater passing through the chamber and increasing when the flow rate of the wastewater is greater than the biofiltering capacity. The discharge orifices each have a dimension selected so that the wastewater discharged from the flow control unit through the orifices flows through the bed of peat at a flow rate no greater than the biofiltering capacity of the peat, when the flow rate of the wastewater passing through the chamber is greater than the biofiltering capacity.

The above biofiltering device is typically capable of treating up to about 550 liters of wastewater per day. As described in U.S. patent application No. 09/572,138, now U.S. Pat. No. 6,372,128 a plurality of such devices can be connected by means of conduits to a distributor box which in turn is in fluid flow communication with the septic tank, for handling larger quantities of wastewater. Generally, up to ten biofiltering devices can be so connected in order to treat up to about 5,500 liters of wastewater per day. When it desired to treat on a daily basis quantities larger than 6,000 liters, the installation of more than ten biofiltering devices becomes costly and complex.

SUMMARY OF THE INVENTION

It is therefore an object of the present invention to overcome the above drawback and to provide an improved biofiltering system which utilizes peat as biofiltering medium and which can efficiently treat large quantities of wastewater irrespective of the flow rate thereof.

In accordance with the present invention, there is provided a biofiltering system for treating wastewater effluent for dissipation through an effluent absorption area and into earth beneath the effluent absorption area. The biofiltering system of the invention comprises a bed of peat overlying the effluent absorption area, the peat defining a biofiltering medium having a predetermined biofiltering capacity, and fluid flow regulating means for allowing the wastewater effluent to be treated to flow at a flow rate greater than the biofiltering capacity of the peat, while not exceeding a predetermined threshold value. The system according to the invention further includes a predetermined number of spaced-apart, elongated distribution conduits arranged over the bed of peat and in fluid flow communication with the fluid flow regulating means, each distribution conduit having a plurality of discharge orifices spaced longitudinally therealong, for distributing the wastewater effluent through the bed of peat in a manner such that wastewater discharged from the distribution conduits through the orifices flows through the bed of peat at a flow rate no greater than the biofiltering capacity of the peat.

According to a preferred embodiment of the invention, the number of distribution conduits, the inner dimension of each distribution conduit and the dimension of each discharge orifice are selected in accordance with the predetermined threshold value so that the wastewater discharged from the distribution conduits through the orifices flows through the bed of peat at a flow rate no greater than the biofiltering capacity of the peat, and preferably equal thereto.

According to another preferred embodiment, the distribution conduits are arranged in spaced-apart parallel relation to one another and are connected downstream to at least one header conduit in fluid flow communication with the fluid flow regulating means, the distribution conduits extending laterally of the header conduit. Preferably, there are two header conduits arranged in spaced-apart parallel relation to one another, the header conduits being connected downstream to a supply conduit extending laterally thereof; the supply conduit is connected downstream to a transport conduit in fluid flow communication with the fluid flow regulating means.

In a particularly preferred embodiment, the distribution conduits, the header conduits, the supply conduit and the transport conduit each have a circular cross-section with a respective inner diameter. The inner diameter of each distribution conduit is smaller than the inner diameter of each header conduit and the inner diameters of the header conduits and supply conduit are smaller than the inner diameter of the transport conduit. Such an arrangement enables the wastewater discharged through the orifices to flow at a substantially uniform flow rate.

According to yet another preferred embodiment, the fluid flow regulating means comprise a reservoir having inlet means for receiving the wastewater effluent to be treated and outlet means coupled to a valve for discharging the wastewater effluent at a flow rate greater than the biofiltering capacity of the peat, while not exceeding a predetermined threshold value; the transport conduit is connected downstream to the valve. Preferably, the outlet means include an outlet conduit connected upstream to the valve. Thus, when it is desired to treat about 6,000 to about 30,000 liters of wastewater per day, the valve is operated so that the flow rate of the wastewater effluent discharged from the reservoir will not exceed a threshold value within a range of about 250 to about 1250 l/hr. For a threshold value within such a range, the number of distribution conduits generally ranges from about 6 to about 18, and the inner diameter of each distribution conduit generally ranges from about 25 to about 50 mm. The discharge orifices, on the other hand, are generally circular and each have a diameter ranging preferably from about 2 to about 8 mm. When the peat used is sphagnum peat having a biofiltering capacity of about 20 l/hr, the orifices each have a diameter of about 6 mm. When using sphagnum peat having a biofiltering capacity of about 22 l/hr, the orifices each have a diameter of about 5 mm. In the case of sphagnum peat having a biofiltering capacity of about 24 l/hr, the orifices each have a diameter of about 3 mm. Such a selection of parameters ensures that the wastewater discharged from the distribution conduits through the orifices will flow through the bed of peat at a flow rate no greater than the biofiltering capacity of the peat.

According to still another preferred embodiment, the biofiltering system further includes fluid flow control means arranged between the bed of peat and the distribution conduits for receiving the wastewater discharged therefrom and causing the wastewater to flow throughout substantially the entire bed of peat. Preferably, the fluid flow control means comprises an elongated, horizontally extending porous membrane having upper and lower surfaces with the lower surface contacting the peat. The membrane is capable of spreading the flow of the wastewater discharged from the distribution conduits as the wastewater flows through the membrane from the upper surface to the lower surface, and into the bed of peat.

In a particularly preferred embodiment, the membrane is a multilayered membrane comprising upper and lower layers formed of non-woven fibers and each having a predetermined density, and an intermediate layer disposed between the upper and lower layers and formed of the non-woven fibers, the intermediate layer having a density less than the predetermined density. The upper and lower layers each have a plurality of spaced-apart apertures extending therethrough.

According to a further preferred embodiment, the bed of peat, the distribution conduits, the header conduits, the supply conduit, the transport conduit and the valve are disposed inside a bottomless ventilated housing resting on the effluent absorption area, the reservoir being disposed outside of the housing with the outlet conduit extending through an opening formed in a sidewall of the housing. In such an embodiment, the biofiltering system further includes means for aerating the peat. Preferably, the means for aerating the peat comprise a network of interconnected, open-ended aeration conduits each having first and second end portions and an elongated intermediate portion extending therebetween and horizontally through the bed of peat at a predetermined depth, the first and second end portions of each aeration conduit extending upwardly from the intermediate portion and having respective free ends disposed at a predetermined heights above the bed of peat with the free end of the first end portion being disposed above the free end of the second end portion so as to permit air circulation in the aeration conduits. The intermediate portion of each aeration conduit is provided with a plurality of aeration orifices spaced therealong for discharging air into the bed of peat.

According to still a further preferred embodiment, the biofiltering system further includes sampling means enabling a sample of treated wastewater to be collected for analysis. Preferably, the sampling means comprise a horizontal tray-like member disposed inside the housing adjacent an other sidewall thereof and at a predetermined depth in the bed of peat, a guide member connected to the tray-like member and a drip conduit in fluid flow communication with the guide member and extending through the other sidewall, the drip conduit having a free end disposed exteriorly of the housing. The tray-like member has a main fluid-receiving surface extending along an inclined plane for causing drops of treated wastewater received on the main surface to flow in a direction towards the other sidewall and the guide member has a guide channel arranged to receive the drops of treated wastewater from the main surface for guiding the drops into the drip conduit. Preferably, the tray-like member has two secondary fluid-receiving surfaces disposed opposite one another and each extending along an inclined plane for causing drops of treated wastewater received on the secondary surfaces to flow in a direction towards the main surface.

The biofiltering system according to the invention enables one to efficiently treat large quantities of incoming wastewater effluent irrespective of the flow rate thereof.

BRIEF DESCRIPTION OF THE DRAWINGS

Further features and advantages of the invention will become more readily apparent from the following description of a preferred embodiment as illustrated by way of example in the accompanying drawings, in which.

DESCRIPTION OF PREFERRED EMBODIMENT

Figure 1:
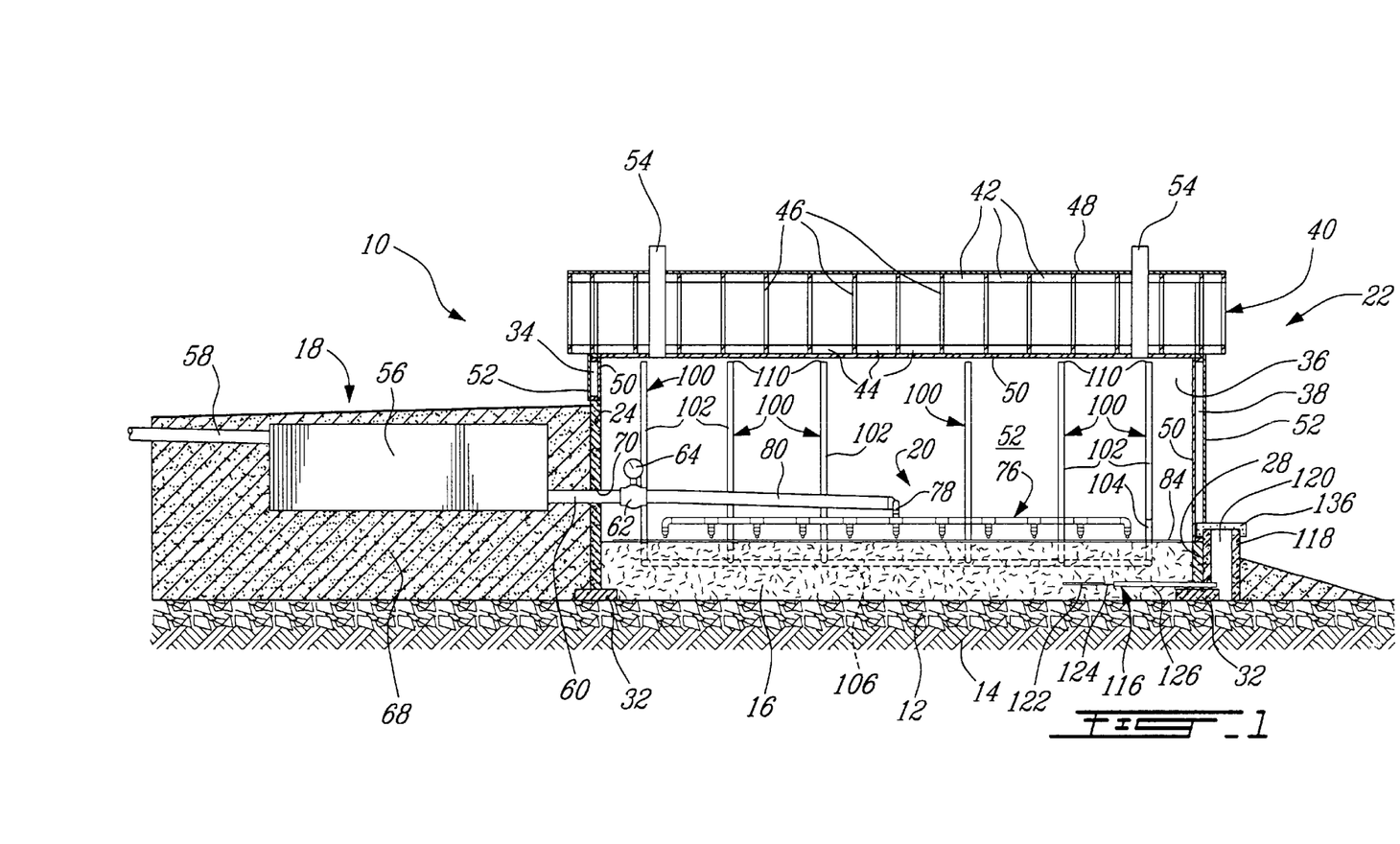
FIG. 1 is a vertical cross-sectional view of a biofiltering system according to a preferred embodiment of the invention, arranged downstream of a septic tank (not shown), for treating the wastewater effluent leaving the septic tank.

Referring first to FIG. 1, there is illustrated a biofiltering system which is generally designated by reference numeral 10 and serves to treat the wastewater effluent leaving a septic tank (not shown) for dissipation through an effluent absorption area 12 and into the earth 14, the effluent absorption area 12 consisting of a layer of crushed stones. The biofiltering system 10 comprises a bed of peat 16 overlying the effluent absorption area 14, a fluid flow regulating unit 18 for allowing to the wastewater effluent to be treated to flow at a flow rate greater than the biofiltering capacity of the peat, while not exceeding a predetermined threshold value, and a fluid distribution unit 20 in fluid flow communication with the flow regulating unit 18 for distributing the wastewater effluent through the bed of peat 16. The bed of peat 16 and the fluid distribution unit 20 are disposed inside a bottomless ventilated housing 22 resting on the effluent absorption area 12.

The housing 22 comprises a foundation formed of four concrete sidewalls 24, 26, 28 and 30 (sidewalls 26 and 30 being shown in FIG. 2) resting on a footing 32 and on which are mounted four wooden sidewalls, only three being shown and designated by reference numerals 34, 36 and 38, and a roof 40 having upper lower windbraces 42 and 44 and a plurality of trusses 46. The roof 40 further includes a sheet metal roofing 48. The wooden sidewalls and the lower windbraces are covered interiorly with STYROFOAM (trademark) panels 50. The wooden sidewalls are also covered exteriorly with metal sheets 52. A pair of spaced-apart ventilation conduits 54 extend through the roof 40.

The fluid flow regulating unit 18 comprises a reservoir 56 having an inlet conduit 58 connected to a dosing chamber (not shown) in fluid flow communication with a septic tank (also not shown) for receiving the wastewater effluent leaving the septic tank, and an outlet conduit 60 connected to a valve 62 for discharging the wastewater effluent at a flow rate greater than the biofiltering capacity of the peat, while not exceeding a predetermined threshold value. The reservoir 56 is disposed outside the housing 22 and buried in a mound of sand 68, the outlet conduit 60 extending through an opening 70 formed in the concrete sidewall 24. The valve 62 which is provided with a flowmeter 64 is disposed inside the housing 22. The reservoir 56 typically has a volume of about 8.5 cubic meters for handling up to about 6,000 liters/day of wastewater effluent, or a volume of about 43 cubic meters for handling up to about 30,000 liters/day of wastewater effluent. If the wastewater effluent entering the reservoir 56 has a flow rate greater than the threshold value, the excess wastewater will simply accumulate in the reservoir 56. In such a case, the valve 62 will partially close to compensate for the increased head of wastewater in the reservoir 56, thereby ensuring that the wastewater effluent discharged from the reservoir 56 through the valve 62 will flow at a flow rate not exceeding the threshold value.

Figure 2:
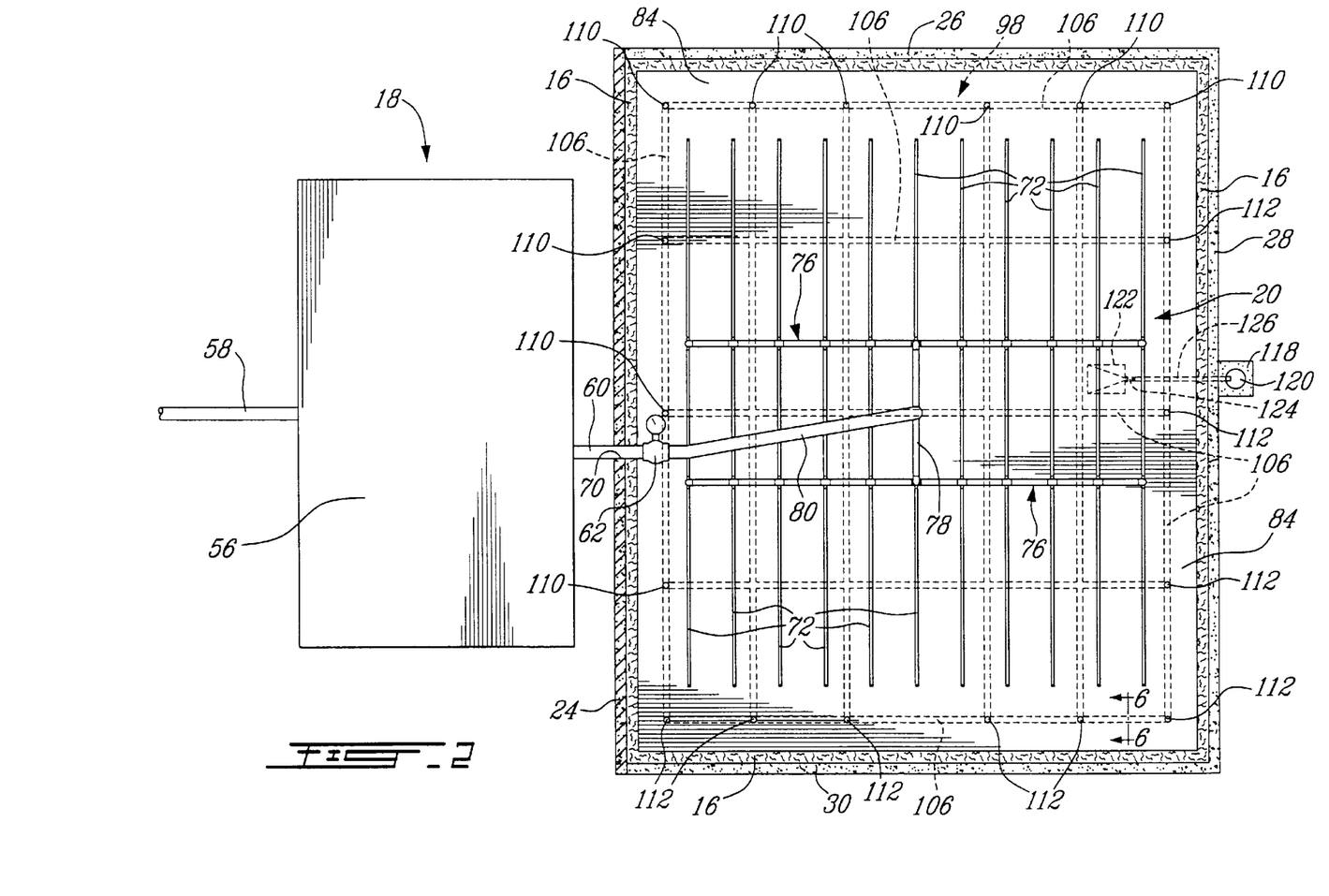
FIG. 2 is a horizontal cross-sectional view of the biofiltering system shown in FIG. 1.
Figure 3:
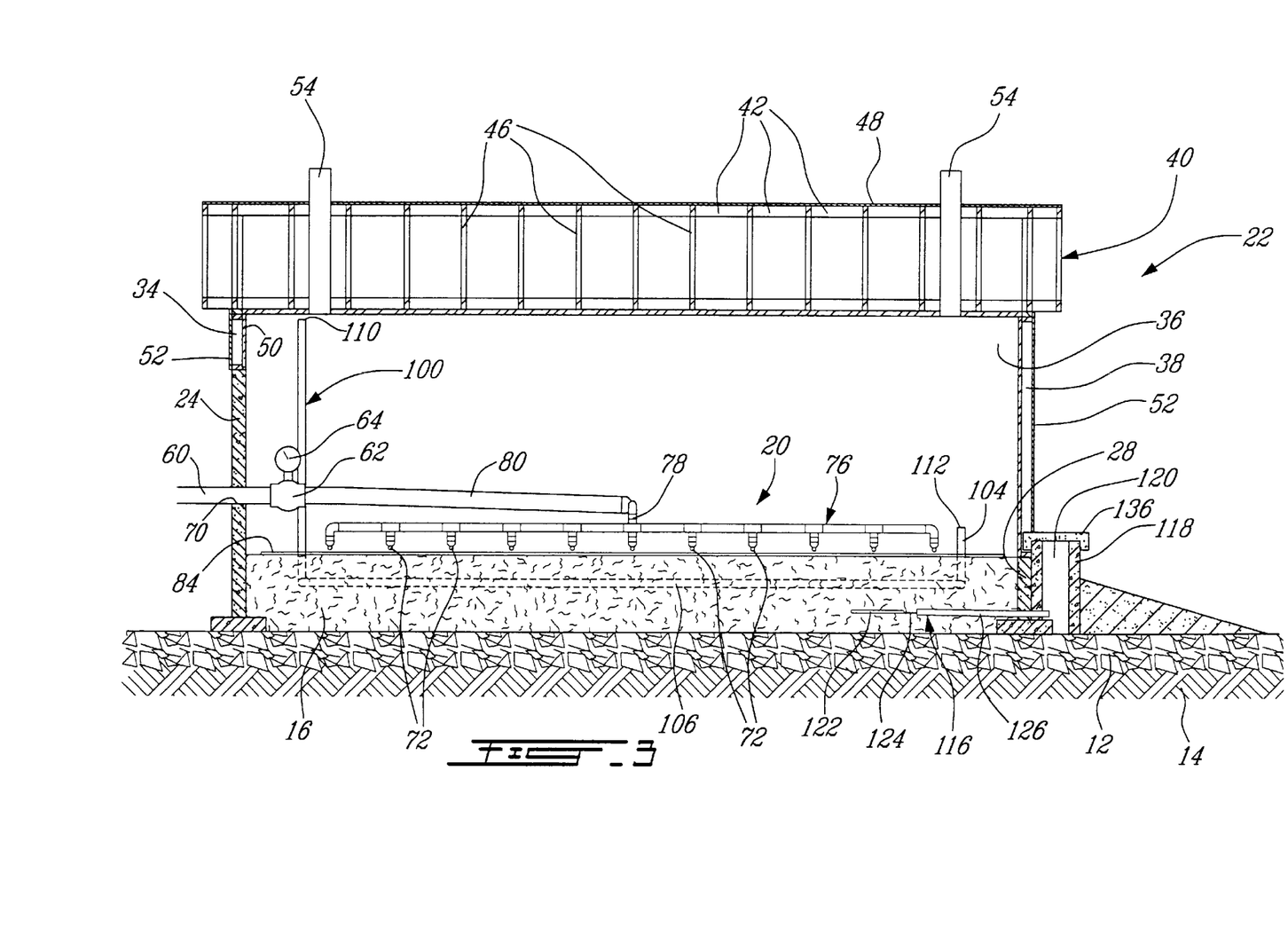
FIG. 3 is an elongated vertical cross-sectional view of part of the biofiltering system shown in FIG. 1.
Figure 4:
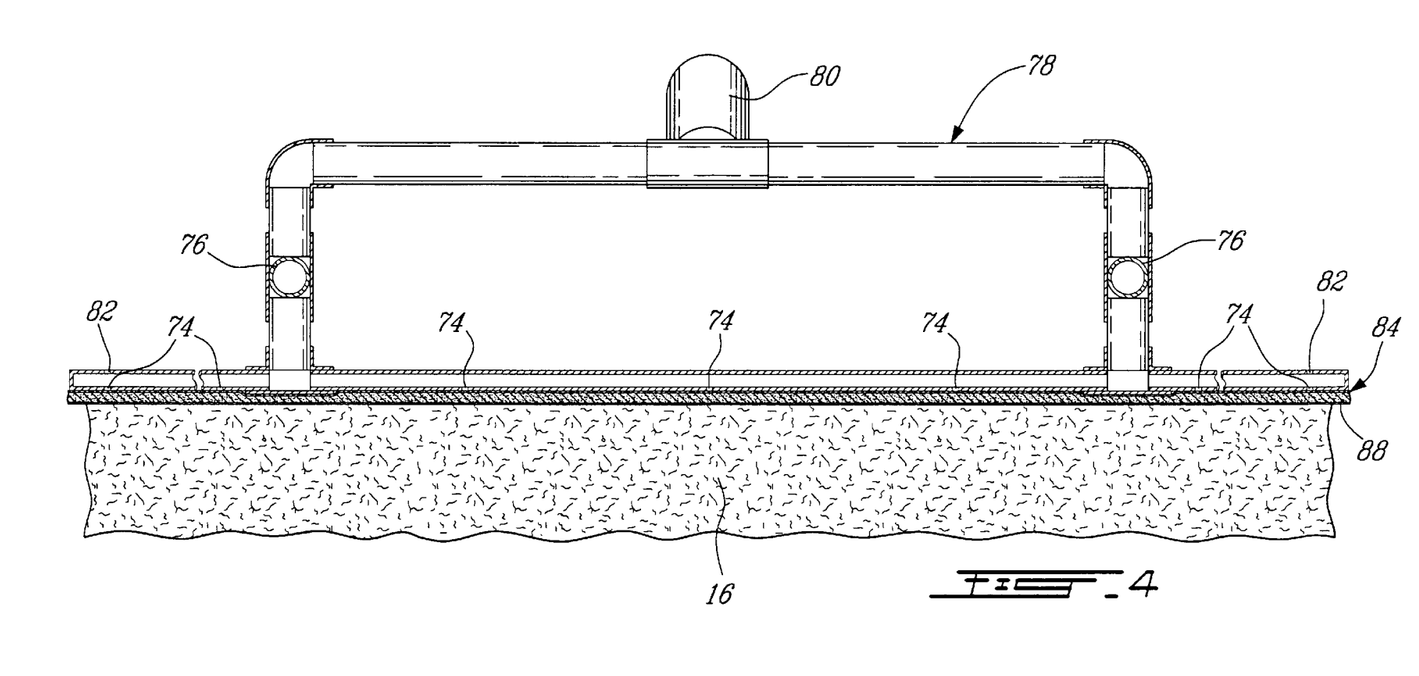
FIG. 4 is an enlarged vertical cross-sectional view showing a detail of the biofiltering system illustrated in FIG. 1.

As best shown in FIGS. 2–4, the fluid distribution unit 20 comprises a predetermined number of elongated distribution conduits 72 of circular cross-section arranged in spaced-apart parallel relation to one another over the bed of peat 16. Each distribution conduit 72 has a predetermined inner diameter and a plurality of circular discharge orifices 74 (shown in FIG. 4) spaced longitudinally therealong with each orifice 74 having a predetermined diameter. The distribution conduits 72 are connected to a pair of spaced-apart parallel manifold-type header conduits 76 of circular cross-section extending laterally of the distribution conduits 72. The header conduits 76 are in turn connected to a supply conduit 78 of circular cross-section extending laterally of the header conduits 76 and connected to a transport conduit 80 of circular cross-section. The latter conduit is connected to the valve 62. The number of distribution conduits 72, the inner diameter of each distribution conduit 72 and the diameter of each discharge orifice 74 are selected in accordance with the aforementioned threshold value so that the wastewater discharged from the distribution conduits 72 through the orifices 74 flows through the bed of peat 16 at a flow rate no greater than the biofiltering capacity of the peat, and preferably equal thereto. As shown in FIG. 4, each distribution conduit 72 is provided at opposite ends thereof with vent orifices 82 for venting entrapped air during initial filling of the distribution conduits 72 with wastewater.

The inner diameter of each distribution conduit 72 is smaller than the inner diameter of each header conduit 76, and the diameters of the header conduits 76 and supply conduit 78 are smaller than the inner diameter of the transport conduit 80. Typically, the distribution conduit 72 each have an inner diameter of about 2.5 cm, the header conduits 76 and supply conduit each have an inner diameter of about 5 cm, and the transport conduit has an inner diameter of about 10 cm. Such an arrangement of conduits causes the wastewater discharged through the orifices 74 to flow at a substantially uniform flow rate. In FIGS. 1–3, the respective dimensions of the inlet conduit 58, outlet conduit 60, distribution conduits 72, header conduits 76, supply conduit 78 and transport conduit 80 are disproportionate to the other components of the system 10, for ease of illustration.

Figure 5:
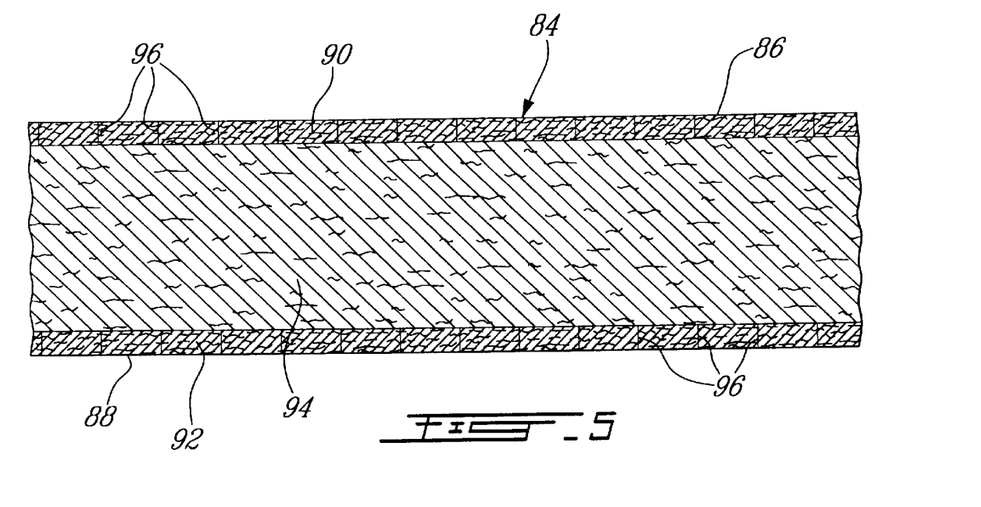
FIG. 5 is a partial sectional view of a fluid flow control membrane used in the biofiltering system shown in FIG. 1.

A fluid flow control unit consisting of an elongated, horizontally extending porous membrane 84 is arranged between the bed of peat 16 and the distribution conduits 72 for receiving the wastewater discharged therefrom and causing the wastewater to flow throughout substantially the entire bed of peat 16. As shown in FIGS. 4 and 5, the membrane 84 has upper and lower surfaces 86,88 with the lower surface 88 contacting the peat. The distribution conduits 72 contact the upper surface 86 of the membrane 84 with the discharge orifices 74 facing the membrane. The membrane 84 is a multilayered membrane comprising upper and lower layers 90,92 formed of non-woven polypropylene fibers and having a density of about 0.1 g/cm$^3$, and an intermediate layer 94 also formed of non-woven polypropylene fibers, but having a density of about 0.05 g/cm$^3$. The upper and lower layers 90,92 each have a plurality of spaced-apart apertures 96 extending therethrough and formed by piercing the layers 90,92 with needles. The membrane 84 is capable of spreading the flow of wastewater discharged from the distribution conduits 72 as the wastewater flows through the membrane from the upper surface 90 to the lower surface 92, and into the bed of peat 16. Thus, the membrane 84 constitutes a fluid flow control unit adapted to receive the wastewater discharged from the distribution conduits 72 and cause the wastewater to flow throughout substantially the entire bed of peat 16.

The treated wastewater effluent discharged from the system 10 is dissipated through the effluent absorption area 12 and into the earth 14. The peat filters suspended particles of organic and inorganic materials present in the wastewater effluent. The anti-microbial properties of the peat combined with those of fungi and actinomycetes present in the peat contribute to eliminating fecal coliforms.

Figure 6:
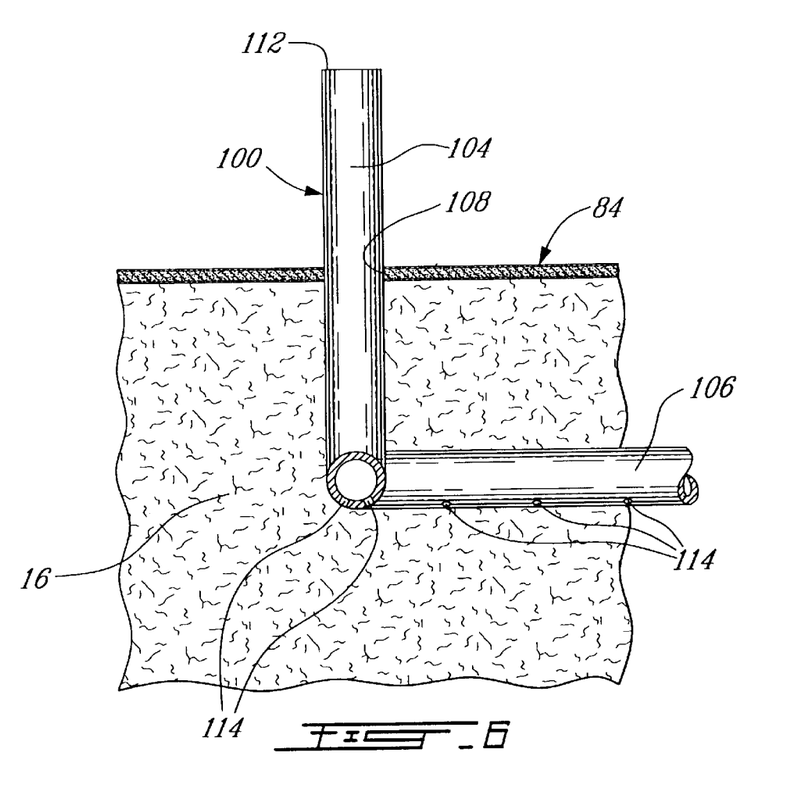
FIG. 6 is a partial sectional view taken along line 6—6 of FIG. 2.

As shown in FIGS. 1, 2, 3 and 6, a network 98 of interconnected, open-ended aeration conduits 100 is provided for aerating the peat. Each aeration conduit 100 is generally U-shaped with two upwardly extending portions 102,104 and an intermediate portion 106 extending therebetween and horizontally through the bed of peat 16 at a predetermined depth. The conduit portions 102 and 104 extend through openings 108 (only one shown in FIG. 6) formed in the membrane 84, and have respective free ends 110 and 112 disposed at predetermined heights above the bed of peat 16, the free end 110 of conduit portion 102 being disposed above the free end 112 of conduit portion 104 so as to permit air circulation in each aeration conduit 100. Typically, the free end 110 of conduit portion 102 is disposed at a height of about 2.5 meters above the bed of peat 16, whereas the free end 112 of conduit portion 104 is disposed at a height of about 0.3 meter above the bed of peat 16. As shown in FIG. 6, the intermediate portion 106 of each aeration conduit 100 is provided with a plurality of longitudinally spaced-apart aeration orifices 114 for discharging air into the bed of peat. Each aeration orifice 114 is oriented downwardly.

Figure 7:
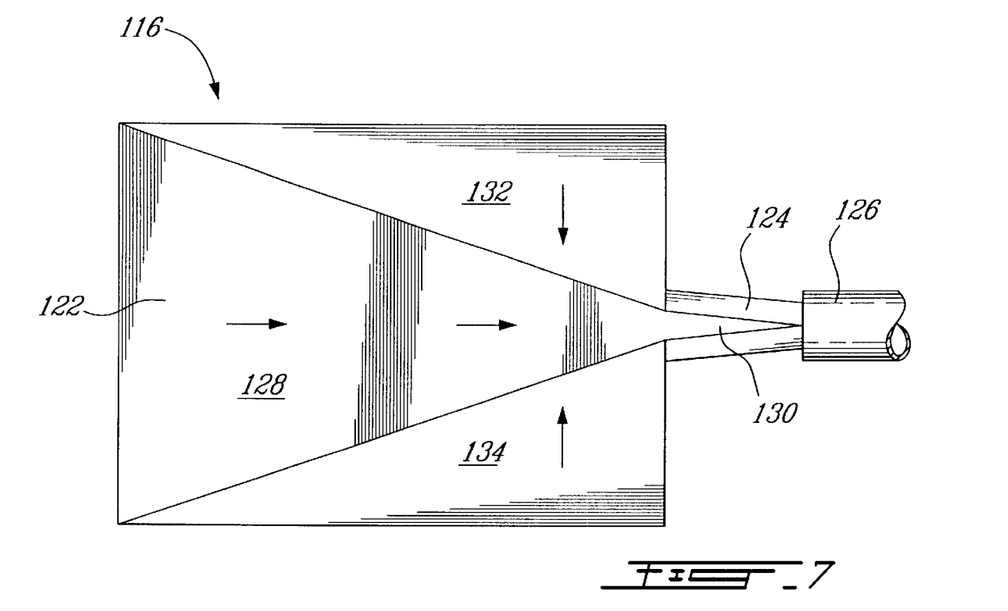
FIG. 7 is a top plan view of a sampling unit used in the biofiltering system shown in FIG. 1 and enabling a sample of the treated wastewater effluent to be collected for analysis.
Figure 8:
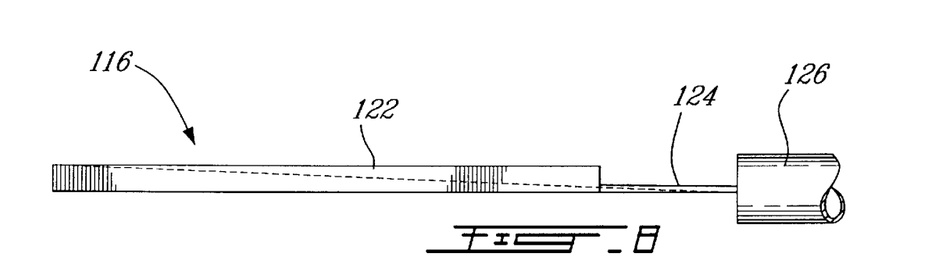
FIG. 8 is a side elevational view shown in FIG. 7.
Figure 9:
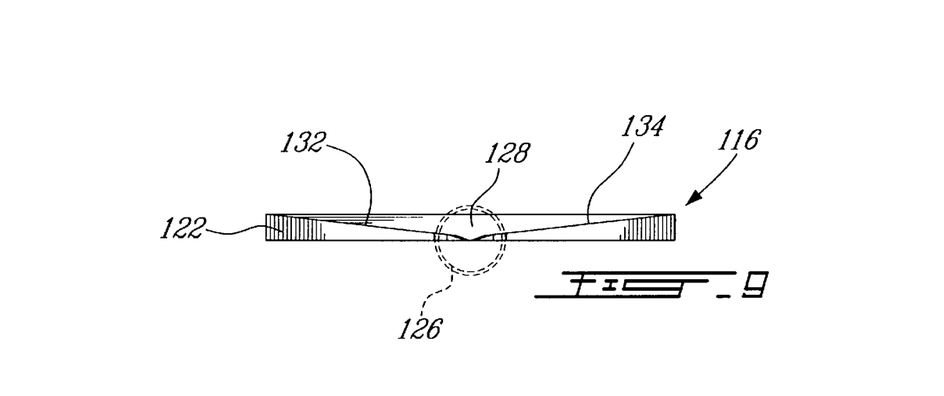
FIG. 9 is an end elevational view of the sampling system shown in FIG. 7, taken from the left-hand side of FIG. 7.

As shown in FIGS. 1, 2 and 3, the biofiltering system 10 includes a sampling unit 116 enabling a sample of the treated wastewater to be collected for analysis. The concrete sidewall 28 of the housing 22 being provided with an integral column 118 of concrete having a sampling hole 120. The sampling unit 116 which is illustrated in more detail in FIGS. 7–9 comprises a horizontal tray-like member 122 disposed adjacent the sidewall 28 and at a predetermined depth in the bed of peat 16, a guide member 124 connected to the tray-like member 122, and a drip conduit 126 in fluid flow communication with the guide member 124 and extending through the sidewall 28 and into the sampling hole 120. As shown in FIGS. 7–9, the tray-like member 122 has a main fluid-receiving surface 128 extending along an inclined plane for causing drops of treated wastewater received on the main surface 128 to flow in a direction towards the sidewall 28 (shown in FIGS. 1–3). The guide member 124, on the other hand, has a guide channel 130 arranged to receive the drops of the treated wastewater from the main surface 128 for guiding the drops into the drip conduit 126. The traylike member 122 further has two secondary fluid-receiving surfaces 132,134 disposed opposite one another and each extending along an inclined plane for causing drops of treated wastewater received on the secondary surfaces 132,134 to flow in a direction towards the main surface 128.

The sampling hole 120 is closed with a removable cover 136. Removal of the cover 136 enables one to gain access to the sampling hole 120 and, by using an elongated spoon-shaped sampling instrument, one can take a sample of the treated wastewater dripping into the hole 120 for analysis of the sample.

I claim:

1. A biofiltering system for treating wastewater effluent absorption area and into earth beneath the effluent absorption area, said biofiltering system comprising:

a bed of peat overlying the effluent absorption area, said peat defining a biofiltering medium having a predetermined biofiltering capacity;

fluid flow regulating means adapted to allow the wastewater effluent to be treated to flow at a flow rate greater than the biofiltering capacity of the peat, while not exceeding a predetermined threshold value; and a predetermined number of spaced-apart, elongated distribution conduits arranged over said bed of peat and in fluid flow communication with said fluid flow regulating means, each distribution conduit having a plurality of discharge orifices spaced longitudinally therealong, said distribution conduits configured to receive the wastewater effluent from said fluid flow regulating means and to distribute said wastewater effluent through said bed of peat in a manner such that wastewater discharged from said distribution conduits through said orifices flows through said bed of peat at a flow rate no greater than said biofiltering capacity.

2. A biofiltering system as claimed in claim 1, wherein each distribution conduit has a predetermined cross-sectional inner dimension and each discharge orifice has a predetermined dimension, and wherein the number of distribution conduits, the inner dimension of each distribution conduit and the dimension of each discharge orifice are selected in accordance with said predetermined threshold value so that the wastewater discharged from said distribution conduits through said orifices flows through said bed of peat at a flow rate no greater than the biofiltering capacity of said peat.

3. A biofiltering system as claimed in claim 2, wherein the number of distribution conduits, the inner dimension of each distribution conduit and the dimension of each discharge orifice are selected in accordance with said predetermined threshold value so that the wastewater discharged from said distribution conduits through said orifices flows through said bed of peat at a flow rate substantially equal to the biofiltering capacity of said peat.

4. A biofiltering system as claimed in claim 2, wherein said distribution conduits are arranged in spaced-apart parallel relation to one another and are connected downstream to at least one header conduit in fluid flow communication with said fluid flow regulating means, said distribution conduits extending laterally of said at least one header conduit.

5. A biofiltering system as claimed in claim 4, wherein there are two header conduits arranged in spaced-apart parallel relation to one another, said header conduits being connected downstream to a supply conduit extending laterally thereof, and wherein said supply conduit is connected downstream to a transport conduit in fluid flow communication with said fluid flow regulating means.

6. A biofiltering system as claimed in claim 5, wherein said fluid flow regulating means comprise a reservoir having inlet means for receiving the wastewater effluent to be treated and outlet means coupled to a valve for discharging the wastewater effluent at a flow rate greater than the biofiltering capacity of said peat, while not exceeding said predetermined threshold value, and wherein said transport conduit is connected downstream to said valve.

7. A biofiltering system as claimed in claim 6, wherein said outlet means include an outlet conduit connected upstream to said valve.

8. A biofiltering system as claimed in claim 7, wherein said bed of peat, said distribution conduits, said header conduits, said supply conduit, said transport conduit and said valve are disposed inside a bottomless ventilated housing resting on said effluent absorption area, said reservoir being disposed outside of said housing with said outlet conduit extending through an opening formed in a sidewall of said housing, and wherein said biofiltering system further includes means for aerating said peat.

9. A biofiltering system as claimed in claim 8, wherein said means for aerating said peat comprise a network of interconnected, open-ended aeration conduits each having first and second end portions and an elongated intermediate portion extending therebetween and horizontally through said bed of peat at a predetermined depth, the first and second end portions of each said aeration conduit extending upwardly from said intermediate portion and having respective free ends disposed at predetermined heights above said bed of peat with the free end of said first end portion being disposed above the free end of said second end portion so as to permit air circulation in said aeration conduits, and wherein the intermediate portion of each said aeration conduit is provided with a plurality of longitudinally spaced-apart aeration orifices for discharging air into said bed of peat.

10. A biofiltering system as claimed in claim 9, wherein said aeration orifices are each oriented downwardly.

11. A biofiltering system as claimed in claim 10, further including sampling means enabling a sample of treated wastewater to be collected for analysis.

12. A biofiltering device as claimed in claim 11, wherein said sampling means comprise a horizontal tray member disposed inside said housing adjacent an other sidewall thereof and at a predetermined depth in said bed of peat, a guide member connected to said tray member and a drip conduit in fluid flow communication with said guide member and extending through said other sidewall, said drip conduit having a free end disposed exteriorly of said housing, and wherein said tray member has a main fluid-receiving surface extending along an inclined plane for causing drops of treated wastewater received on said main surface to flow in a direction towards said other sidewall and said guide member has a guide channel arranged to receive said drops of treated wastewater from said main surface for guiding said drops into said drip conduit.

13. A biofiltering system as claimed in claim 12, wherein said tray member has two secondary fluid-receiving surfaces disposed opposite one another and each extending along an inclined plane for causing drops of treated wastewater received on said secondary surfaces to flow in a direction towards said main surface.

14. A biofiltering system as claimed in claim 5, wherein said distribution conduits, said header conduits, said supply conduit and said transport conduit each have a circular cross-section with a respective inner diameter, and wherein the inner diameter of each said distribution conduit is smaller than the inner diameter of each said header conduit and the inner diameters of said header conduits and said supply conduit are smaller than the inner diameter of said transport conduit.

15. A biofiltering system as claimed in claim 14, wherein said predetermined threshold value ranges from about 250 to about 1250 l/hr, the number of said distribution conduits ranges from about 6 to about 18, the inner diameter of each said distribution conduit ranges from about 25 to about 50 mm, and wherein said discharge orifices are circular and each have a diameter ranging from about 2 to about 8 mm.

16. A biofiltering system as claimed in claim 15, wherein said peat is sphagnum peat having a biofiltering capacity of about 20 l/hr and wherein said discharge orifices each have a diameter of about 6 mm.

17. A biofiltering system as claimed in claim 15, wherein said peat is sphagnum peat having a biofiltering capacity of about 22 l/hr and wherein said discharge orifices each have a diameter of about 5 mm.

18. A biofiltering system as claimed in claim 15, wherein said peat is sphagnum peat having a biofiltering capacity of about 24 l/hr and wherein said discharge orifices each have a diameter of about 3 mm.

19. A biofiltering system as claimed in claim 1, further including fluid flow control means arranged between said bed of peat and said distribution conduits for receiving the wastewater discharged therefrom and causing the wastewater to flow throughout substantially the entire bed of peat.

20. A biofiltering system as claimed in claim 19, wherein said fluid flow control means comprises an elongated, horizontally extending porous membrane having upper and lower surfaces with the lower surface contacting said peat, and wherein said membrane is capable of spreading the flow of the wastewater discharged from said distribution conduits as said wastewater flows through said membrane from said upper surface to said lower surface, and into said bed of peat.

21. A biofiltering system as claimed in claim 20, wherein said distribution conduits contact the upper surface of said membrane with said discharge orifices facing said membrane.

22. A biofiltering system as claimed in claim 20, wherein said membrane is a multilayered membrane comprising upper and lower layers formed of non-woven fibers and each having a predetermined density, and an intermediate layer disposed between said upper and lower layers and formed of said non-woven fibers, said intermediate layer having a density less than said predetermined density, and wherein said upper and lower layers each have a plurality of spaced-apart apertures extending therethrough.

23. A biofiltering system as claimed in claim 22, wherein said non-woven fibers are made of polypropylene and wherein said upper and lower layers each have a density of about 0.1 g/cm$^3$ and said intermediate layer has a density of about 0.05 g/cm$^3$.

24. A biofiltering system as claimed in claim 1, wherein each said distribution conduit is provided at opposite ends thereof with vent orifices for venting entrapped air during initial filling of said distribution conduits with wastewater.

* * * * *